United States Patent Office 3,658,772
Patented Apr. 25, 1972

3,658,772
ACRYLIC ACID POLYMERS
Henry Volk, Bay City, and Percy J. Hamlin, Midland, Mich., assignors to The Dow Chemical Company, Midland, Mich.
No Drawing. Continuation-in-part of application Ser. No. 587,964, Oct. 20, 1966, now Patent No. 3,493,500. Divided and this application Feb. 2, 1970, Ser. No. 8,080
Int. Cl. C08f 1/08, 15/02, 15/40
U.S. Cl. 260—80.3 N
14 Claims

ABSTRACT OF THE DISCLOSURE

Water-soluble copolymers of 30 to 95 percent by weight of acrylic acid with from 70 to 5 percent by weight of acrylamide with or without additional diluent comonomers are prepared in the form of fluid, pourable, aqueous suspensions of polymer solids by carrying out the polymerization at a temperature of from just above the freezing point of the reaction mixture to about 60° C. in a solution of the monomers in an aqueous inorganic salt solution at a pH of from about 1 to about 3.2 with agitation sufficient to maintain precipitated copolymer in suspension. Said salt solution contains a predetermined concentration of alkali metal or ammonium salt of a strong inorganic acid in the range of from about 0.1 percent to 10 percent by weight of the reaction mixture, the concentration of salt being adjusted to precipitate high molecular weight copolymer of the composition employed under the particular reaction conditions of a specific polymerization. The copolymers so prepared can be readily dissolved in water, are of high molecular weight and are particularly useful as flocculants to improve the rate of raw sewage solids and of a variety of mineral solids.

CROSS-REFERENCE TO RELATED APPLICATION

This application is a continuation-in-part of our copending application, Ser. No. 587,964, filed Oct. 20, 1966, now U.S. Pat. 3,493,500.

SUMMARY OF THE INVENTION

The present invention concerns a novel polymerization process for water-soluble acrylic acid copolymers, i.e., copolymers of substantial proportions of acrylic acid with acrylamide and certain copolymers thereof with other water-soluble monomers. A further concern of the invention is to provide such water-soluble acrylic copolymers in the form of highly useful and conveniently fluid suspensions of polymer solids in aqueous media. Novel polymeric compositions are also provided.

The solution polymerization of acrylic acid and mixtures thereof with water-soluble comonomers to prepare water-soluble polymers is widely practiced. Such polymers are used in a wide variety of arts such as in the flocculation and filtration of aqueous suspensions of solids, oil well drilling fluids, secondary recovery of oil by water flooding and paper making.

Although a number of successful processes for the preparation of such polymers are known, current processes generally involve solution polymerization in an aqueous reaction medium. Considerable difficulty is encountered in these processes when working up a useful product from the polymerization gel. Often the gel of a solution polymerization reaction is a tough rubbery mass. This is especially true if high molecular weight polymers are prepared.

Techniques for working up the polymer gel include precipitation of the polymer with a non-solvent, which is miscible with the polymerization gel, or drying the gel to obtain a solid polymeric residue. These techniques are illustrated by the claimed processes of recent U.S. Pats. 3,041,318; 3,042,970; 3,046,259 and 3,215,680.

Although successful to a degree, these techniques introduce further processing problems. For instance, precipitation of the polymer with a solvent necessitates solvent recovery for efficient operation. Drying the polymerizate as by heating it on drum rolls, while a direct approach, has several drawbacks such as achieving polymer release from the rolls and molecular degradation as the result of heating. Also, whenever a stiff rubbery polymerization gel is neutralized prior to drying, the mixing of reagents, with the gel is necessitated. The energy requirements to accomplish this are substantial.

Improved methods for preparing water-soluble polymers of acrylic monomers have long been sought and numerous patented processes have resulted from extensive research in this field. Nevertheless, improved polymerization processes are needed which will permit polymerization of the acrylic monomers in inert and inexpensive solvents, such as water. Particularly a polymerization process is needed for high molecular weight acrylic acid copolymers such that the polymer is readily adapted for separation or use directly from the polymerizate. Thus, it would be especially desirable to provide a high molecular weight, water-soluble acrylic acid copolymer of convenient application without separating the polymer solids from the polymerizate. Additionally, it would be highly desirable to provide such water-soluble polymers in the form of a fluid polymerizate from which the polymer may be efficiently and easily separated. A still further object would be the preparation of a polymerizate useful in the manufacture of novel modified flocculant compositions and particularly in the production of polymerizate having outstanding flocculating properties. The foregoing objects, and other benefits, as will become apparent hereinafter, are accomplished in the present invention.

The present invention involves the discovery that acrylic acid copolymers, which include copolymers thereof with from about 5 up to about 70 weight percent of acrylamide comonomer, or copolymers thereof with small amounts of optional diluent monomers copolymerizable with the acrylic monomers and soluble as a monomer in the monomer system, can be polymerized in aqueous solution to form fluid, liquid suspension polymerizates of the polymers. That is, the polymer exists in the polymerizate largely in the form of suspended solids. These suspension polymerizates are opening to light.

Such suspension polymerizates are achieved by polymerizing a water-soluble monomer composition comprising at least about 10 weight percent of acrylic monomers in an acidic water solution in the presence of an amount of a water-soluble inorganic salt sufficient to precipitate polymer as it is polymerized in solution, but insufficient to precipitate the monomer. Suitable water-soluble salts include for example alkali metal and ammonium (including substituted ammonium) salts of strong inorganic acids which do not inhibit the polymerization reaction. The minimum amount of salt necessary to induce precipitation of acrylic acid copolymers under the above conditions will vary according to the composition and temperature of the monomer charge but will generally fall within the range from at least about 0.1 percent, usually at least about 1 percent, up to about 10 percent, by weight, based on the weight of the total polymerization system. As a rule, the lower the temperature of the reaction system, the lower will be the minimum amount of salt required to produce the suspension polymerizate. In any particular case for a chosen monomer composition, pH and polymerization temperature, the minimum required salt concentration can be readily predetermined by running a series of test polymerizations with varying amounts of the salt following the general procedure of the examples as set forth hereinafter.

For best results, an alkali metal or ammonium salt of sulfuric, hydrochloric, phosphoric or nitric acid is used and no more salt is used than is sufficient to form a polymer suspension. With copolymers of acrylic monomers containing at least 30 weight percent of an acrylic acid, stable suspensions of solid polymers are obtained, i.e., they do not dissolve on standing. Dissolution of the polymer results in the formation of a translucent to clear gel.

Critical to successful operation in accordance with the invention is initiating the polymerization reaction at a pH within the range from about 1 up to about 3.2, preferably within the range from about 2 to about 3.0. A further essential condition is supplying agitation to the polymerization system during the polymerization reaction. The agitation required is that sufficient to keep the disperse solid polymer, as it forms, suspended throughout the reaction system. Shortly after polymerization is initiated the reaction mixture becomes viscous by reason of the formation of copolymers of molecular weight as yet insufficient to precipitate. Thus the agitator must be of sufficient power to maintain agitation in this viscous intermediate stage but should not be of such power as to cause a high rate of shear and thereby degrade the high molecular weight polymer after it has formed.

Preferably the polymerization is carried out under an atmosphere in which the oxygen content has been reduced. This can be accomplished by purging the reaction system with an inert gas essentially free of oxygen to reduce the oxygen content of the atmosphere above it, below about 1 percent by weight. In addition it is frequency desirable to pass such inert gas through the monomer solution to remove dissolved oxygen therefrom.

By conducting the polymerization reaction in the foregoing manner, flowable, i.e., fluid, polymerizates are prepared in systems containing up to as much as about 30 percent by weight, or more, of initial dissolved monomer charge which, upon polymerization, becomes a dispersed precipitate of polymer solids. Suspensions with as little as 1 percent by weight suspended polymer solids can be prepared, but usually more concentrated suspensions are desired for production economy. Preferably, polymer solids will be within the range from about 10 to 30 percent by weight of the total reaction mixture.

Depending upon the proportion of catalyst used, and control of other process parameters recognized by the art skilled as affecting molecular weight, acrylic acid copolymers can be prepared in accordance with the invention having molecular weights up to ten million or more.

The polymerizates of acrylic acid copolymers prepared according to the invention can be utilized as such, simply by dispersing them in an applicating aqueous medium. When diluted sufficiently, the acid form of the polymerizate will dissolve in water a evidenced by an increase in the viscosity of the water. The more readily soluble salt form of the polymer can be prepared by adjusting the pH of the applicating solution with a suitable base. The polymerizates produced in accordance with this invention are of high molecular weight and have been found especially useful as flocculants to improve the rate of sedimentation of sewage solids and of various mineral solids.

Alternatively, a solid polymeric product can be recovered from the polymerizate by coagulating the dispersed polymer solids and filtering the polymerizate to recover the solid polymer. If desired, the dry acidic polymer can be blended with sufficient alkali carbonate or bicarbonate solids to prepare a readily dispersing self-neutralizing admixture.

Interestingly, the unneutralized acrylic acid copolymers of the invention can be employed in the acid form for many purposes including the efficient flocculation of aqueous suspensions of inorganic and organic solids.

The salts of the copolymers can be prepared simply by forming a dilute aqueous solution of the suspension polymerizate, or the solid copolymer previously recovered therefrom, and adjusting the pH of the dilute solution with a soluble alkali base to form a salt of the copolymer. The resulting dissolved polyelectrolyte is also a highly effective flocculant. Such neutralization is best carried out in solutions with less than about 5 percent by weight polymer solids to avoid forming a gel too viscous for convenient use.

Acrylic amide monomers useful for preparing copolymers with acrylic acid, in accordance with the invention, include acrylamide and the water-soluble, nitrogen-substituted acrylic amides. Illustrative of such monomers are N-alkyl, N,N-dialkyl, N-aminoalkyl and N-hydroxyalkyl substituted derivatives of acrylamide, such as N-methyl acrylamide, N-isopropyl acrylamide, N,N-dimethyl acrylamide, N,N-dimethylaminomethyl-N-acrylamide, N,N-dimethylaminoethyl-N-acrylamide and N-methylaminoisopropyl-N-acrylamide.

Although the invention generally contemplates copolymers of acrylic acid with acrylic amides, other monomers may be used in amounts insufficient to render the solution-polymerized product soluble in the acidic polymerizate. (Such a third class of monomers is termed herein "diluent monomers"). Such diluent monomers are generally used in amounts less than about 25 weight percent, based on the weight of the monomer charge. These diluent comonomers may be any water-soluble monomer which is soluble in and copolymerizable with acrylic acid. Exemplary of such other comonomers are the cationic, water-soluble aminoalkyl acrylates including for example aminoethyl acrylate, dimethylaminoethyl acrylate, methylaminoethyl methacrylate and dimethylaminoethyl methacrylate. These are highly preferred as a diluent monomer. The copolymers prepared therefrom have each anionic and cationic moieties. Still other comonomers include N-vinylpyridine, N-vinylpyrrolidone, N-vinyloxazolidinone, N-vinyl-5-methyloxazolidinone, acrylonitrile and vinylbenzyltrimethyl ammonium chloride. Other copolymers may contain anionic monomers. Examples of such are styrene sulfonic acid, vinyl sulfonates, sulfoethyl acrylates, maleic acid and the like. In general, any ethylenically unsaturated monomer at least slightly water-soluble and interpolymerizable with acrylic acid, or mixtures of acrylic acid and acrylic amide, can be incorporated into the polymerization systems of the present invention. Such monomer mixtures will contain at least about 30 weight percent of acrylic acid and usually no more than about 20 percent by weight of an optional diluent monomer other than acrylic acid or an acrylic amide monomer.

The preferred polymers of the invention are copolymers of acrylic acid and acrylamide having from 70 to 30 weight percent acrylic acid and correspondingly from 30 to 70 weight percent acrylamide. It is possible to prepare these copolymers with ultra high molecular weights in excess of two million utilizing a comparatively small amount of the inorganic salt in the polymerization system. For instance, whereas at least about 10 to 20 percent by weight of an inorganic salt may be necessary to prepare suspension homopolymers of acrylic acid; as little as 1 percent by weight of the same salt will produce suspensions of copolymers of acrylic acid and acrylamide within the above preferred monomer composition range. In the preparation of such copolymers, the amount of water-soluble salt used, especially alkali metal salts, will vary for best results within the range from 1 to 8 percent by weight of the polymerization system.

As the amount of acrylic acid in a copolymer is decreased below the 30 weight percent specified above, the amount of salt necessary to produce a suspension of the polymer becomes substantial. Also, with the use of large amounts of salt, under the conditions of the present invention, a lower molecular weight product is usually obtained. Such products have substantially less effectiveness as flocculants.

Salts useful in the practice of the invention include the water-soluble alkali metal and ammonium salts of strong inorganic acids, i.e., having an ionization constant greater than about $1\times10^{-3}$. The preferred salts are the alkali metal salts of the strong mineral acids provided the anion of said acid does not aversely affect the polymerization reaction. Ammonium salts also are particularly useful. Ammonium chloride is a preferred salt for the preparation of polymerizates of superior long term stability as fluid suspensions. Exemplary salts are those of hydrochloric, sulfuric, phosphoric and nitric acids. The useful salts may be employed alone or in combinations.

A general rule is that the hydrochloric acid salts are more effective, in that smaller amounts are required, than other inorganic acid salts with increasing acrylic acid content in the monomer charge. For monomer charges having in excess of 30 percent by weight acrylic acid, sodium chloride is the preferred salt. For best results, salts of hydroiodic acid should be kept to a minimum because of their normal inhibitory effect on the polymerization system. Similarly, strong oxidizers, such as chlorates, bromates, iodates, chromates and the like, are avoided since such oxidizers interfere with the redox catalyst system usually employed in the polymerization.

As previously set forth, the pH of the polymerization system must be carefully controlled and adjusted to within the range from about 1 up to the maximum of about 3.2. Depending upon the nature of the monomers charged, i.e., whether acidic, free base or salt forms are used, the polymerization charge may need adjustment to the desired pH range by the addition, as needed, of a strong mineral acid such as sulfuric or hydrochloric acid.

The agitation for the polymerization reaction may be supplied in the form of any convenient means such as stirrers, shaking or rotating reaction vessels, or turbulent fluid flow as in a tubular continuous reactor. The sufficiency of the agitation is readily determined by observing whether polymer precipitating from the solution polymerization system remains suspended and dispersed in the polymerizate during the polymerization reaction.

When operating within the preferred limits for monomer composition and with low salt contents on the order of 1 to 8 percent by weight salt, based on the weight of the total polymerization system, suspensions of the copolymer are obtained which are stable as suspensions almost indefinitely. That is, suspensions are prepared which will remain fluid and readily flowable for periods in excess of several months. In some cases, when the polymerization is carried out at low temperatures and with salt concentrations at the low end of the range, it may be desirable to add more salt after completion of polymerization to assure that the polymer does not dissolve on standing.

It has been found that the copolymers containing from about 40 to about 60 percent by weight of acrylic acid are more readily precipitated than are copolymers having less than 40 percent or more than 60 percent acrylic acid moieties. Thus when a mixture of approximately equal parts of acrylic acid and acrylamide is polymerized under low temperature conditions, i.e., at temperatures in the range of 20°–40° C., and at a pH of 2 to 2.5, less than 1 percent of sodium chloride in the polymerization medium suffices to produce a high-molecular-weight copolymer product in the form of a flowable suspension. Since excessive salt concentrations lead to the production of low molecular weight copolymers it is generally desirable to carry out the polymerization in a medium containing just sufficient salt to produce the desired fluid suspension for the particular copolymer composition and other reaction parameters employed. The minimum effective salt concentration for a particular salt and copolymer composition can be predetermined by running a series of small scale polymerizations in which the salt concentration is varied systematically while maintaining all other reaction parameters constant. Such small scale tests can be readily carried out by the methods shown in the working examples hereinafter.

In addition to the foregoing parameters, polymerization of the monomer charge is initiated with any one of a great number of free radical polymerization catalytic means including catalytic irradiation and chemical catalysts. Illustrative chemical free radical catalysts include tertiary-butylhydroperoxide, ditertiarybutylperoxide, benzoyl peroxide, hydrogen peroxide, ammonium persulfate, potassium persulfate, sodium persulfate, sodium chlorate, potassium chlorate, ammonium chlorate, sodium perborate, potassium perborate, ammonium perborate, sodium percarbonate, potassium percarbonate, ammonium percarbonate and the like. As a redox system, one may use catalysts comprising an oxygen containing compound and a reducing agent, such as the combination of sodium persulfate with sodium bisulfite, sodium persulfate with potassium bisulfite, potassium persulfate with sodium bisulfite, potassium persulfate with potassium bisulfite, ammonium persulfate with sodium thiosulfate and the like. When higher molecular weight polymers are desired, a combination of an alkali metal bromate and an alkali metal sulfite or an alkali persulfate with a tertiary amine can be used. These latter catalytic combinations are described in significant detail in the U.S. Pat. 3,002,960. As a general rule, the catalysts used in the present invention will be used in an amount between about 0.0005% and 1% by weight based on the weight of the monomer and preferably from about 0.001% and .02% by weight, same basis, when high molecular weight polymers are produced. Enough catalyst is added to achieve polymerization and the formation of a suspension polymerizate.

Having prepared the polymerization charge and provided for the required agitation to maintain dispersion of the polymer as formed, polymerization is usually initiated by removing oxygen from the system and maintaining the aqueous solution of the acrylic acid and acrylamide with or without other diluent monomers at a temperature at which the catalyst system is effective. Removal of oxygen can be achieved by a chemical oxygen scavenger or by physical means such as evacuating or purging the system with a gas which is essentially free of oxygen. The system is then maintained at a temperature sufficient to achieve polymerization of the monomer charge. This can be accomplished from temperatures as low as just above the freezing point of the system up to about 100° C. As previously mentioned, lower polymerization temperatures favor the formation of the suspension polymerizates with the use of less salt. Thus to prepare polymer dispersions in accordance with the present invention the temperature of polymerization is within the range from just above the freezing point to about 60° C. and preferably from about 20° C. to about 40° C. Polymerization is continued until a major portion of the charged monomer is converted to polymer. Conversions of at least about 25 percent are required for the onset of polymer precipitation in the reaction system.

The molecular weight of the resulting polymer is, of course, dependent in a large measure upon the amount of catalyst used, temperature of polymerization and the time allowed for the reaction. Optimum molecular weights will be achieved for the copolymers by utilizing as little of the inorganic salt as is necessary to achieve a fluid, i.e., pourable, polymerizate or polymer suspension.

As previously mentioned, the suspensions of solid polymer in the polymerizate are often stable as suspensions for an extended period of time. However, to extend this stability, it is desirable to incorporate an additional amount of the inorganic salt into the suspension upon completion of the polymerization reaction. An additional amount of a water-soluble inorganic salt of a strong acid, either the same as was used in the polymerization or a different one, in an amount from about 0.1 up to about 5 percent by weight, based on the total polymerizate, will aid in keeping the suspension fluid. Such additional amounts of salt are most desirable when preparing high molecular weight polymers in the presence of the minimum, or approximate minimum amount of inorganic salt necessary to achieve precipitation of a solid polymer from the solution polymerization system.

In the event a solid polymeric product is desired, the polymerizate can be readily coagulated by the addition thereto of an organic solvent miscible with the polymerization system. Such solvents include for example acetone, methanol and ethanol. Incorporation of such solvent into the polymerizate causes the coagulation of the disperse polymeric solids which can be readily recovered from the polymerizate by filtration. A powdery particulate polymeric product is obtained upon drying and grinding of the filter cake.

The following examples further illustrate the compositions and processes of the present invention.

EXAMPLES 1–7

A series of polymerizations were carried out to illustrate the parameters and results of the present invention. All polymerizations were conducted in a 3 necked, 1 liter reaction vessel equipped with a stirrer, nitrogen sparger, temperature control means and a reflux condenser. After the polymerizate ingredients, including monomer, salt and water were added, the system was purged with nitrogen. A redox catalyst was then charged and the system was again purged with nitrogen. Thereafter the polymerization conditions for a given period of time or until a desired conversion of monomer to polymer was achieved. Throughout the polymerization agitation was maintained at a rate sufficient to disperse the precipitated polymer as formed. In each polymerization run, the amount of monomer was 10 percent, based on total polymerizate. The polymerizations were catalyzed with potassium persulfate and sodium metabisulfite using 1.87 parts of the former ingredient for each part by weight of the latter. All polymerizations were initiated at room temperature of about 25° C. The measured pH of each reaction system was about 2.5. The other details of the polymerization systems including the type and amount of salt used, monomer charge composition and amount of catalyst composition, are listed in the following table along with results of the polymerization reactions.

times enhances the effectiveness of a salt for forming a suspension polymerizate.

Usually alkali metal salts of hydrochloric acid and hydrobromic acid are more effective for forming suspension polymerizates of polymers having high acrylic acid content and alkali metal salts of sulfuric acid are more effective for forming suspension polymerizates of polymers having high acrylamide contents within the limits prescribed for making suspension polymerizates.

EXAMPLE 8

Employing the apparatus and following the general method of Examples 1, 40 grams of sodium chloride is dissolved in 400 grams of distilled water in the reaction vessel and 57 grams of freshly distilled acrylic acid and 3 grams of sublimed acrylamide dissolved therein with stirring. The resulting charge in the form of a colorless solution having a pH of 2.2 is freed of oxygen by sparging nitrogen therethrough for about 20 minutes. Thereafter while maintaining the nitrogen atmosphere in the reaction vessel 1 milliliter of aqueous 0.16 percent solution of $Na_2S_2O_5$ and 1 milliliter of aqueous 0.3 percent solution of $K_2S_2O_8$ are added to the charge as catalysts to initiate polymerization at a temperature of about 23° C. During the polymerization the reaction mixture is agitated continuously with a motor-driven paddle-type stirrer and the temperature of the mixture rises to about 35° C. Stirring under the nitrogen atmosphere is continued for a period of 16 hours. During the initial phase of the polymerization the reaction mixture becomes viscous and appears as a clear gel. As the polymerization continues, the gel gradually becomes opaque and less viscous until the final product is in the form of an opaque, white, fluid suspension. When this product is diluted 100-fold with water the polymer dissolves readily to produce a clear solution which can be neutralized with sodium hydroxide and then be added directly to suspensions of solids such as raw sewage to flocculate such solids.

In exactly similar fashion, a fluid suspension of a copolymer of 30 percent by weight of acrylic acid and 70 percent by weight of acrylamide is prepared by employing the above recipe and procedure except that the starting charge contained 18 grams of acrylic acid and 42 grams of acrylamide.

TABLE I

| Ex. No. | Monomer comp.[1] | Salt | | Catalyst conc.,[2] percent | Poly. time (hrs.) | Monomer conversion, percent | Polymer viscosity (cps.)[3] | Polymerizate, character[4] | Flocculation rate[5] | | |
|---|---|---|---|---|---|---|---|---|---|---|---|
| | | Type | Conc., percent | | | | | | Dose 1 ml. (sec.) | Dose 2 ml. (sec.) | Dose 3 ml. (sec.) |
| 1 | 90% AA/10% AM | NaCl | 5 | .092 | 20 | 95.4 | | Suspension | | | |
| 2 | 50% AA/50% AM | $Na_2SO_4$ | 10 | .0092 | 16 | 75 | 81.5 | do | 5 | 1.9 | 0.8 |
| 3 | 40% AA/60% AM | $Na_2SO_4$ | 10 | .0092 | 22 | 81.3 | 122 | do | 2.1 | 0.3 | 0.3 |
| 4 | 40% AA/60% AM | NaCl | 10 | .0092 | 20 | 93.2 | 54 | do | 4.7 | 1.6 | 0.9 |
| 5 | 40% AA/60% AM | NaCl | 0.25 | .0092 | 20 | 79.8 | 61.5 | do | 6.9 | | 1.1 |
| 6 | 40% AA/60% AM | $Na_2SO_4$ | 0.25 | .0036 | 20 | 75.5 | 37.4 | do | 15.0 | | 5.3 |
| 7 | 30% AA/70% AM | $Na_2SO_4$ | 10 | .0092 | 16 | 90.8 | 17.4 | Thick suspension | 2.9 | 1.2 | 0.3 |

[1] AA=acrylic acid; AM=acrylamide.
[2] The amount of catalyst is in terms of percent by weight of the monomer charge.
[3] The reported viscosity value is that of a 0.4 percent solution of the polymer in 0.5 N NaCl, zs measured with an Ostwald viscosimeter at 30° C.
[4] Polymerizates characterized as a "suspension" were highly fluid or pourable liquids. All such suspensions were opaque to light and had a milky appearance. "Thick suspensions" had generally substantially higher viscosities but were still manifestly fluid suspensions of solids and were opaque to light.
[5] The "flocculation rate" is the rate of settling obtained by treating aliquots of a 10% slurry of a montmorillonite clay in 0.6 normal sodium hydroxide solution with one, two and three milliliter aliquots of a 0.025 percent by weight solution of the polymer in water. After mixing the polymer dose with the clay slurry in a 100 milliliter stoppered graduate the slurry is revolved three times and the time for the solids of the slurry to settle from the 90 milliliter to the 60 milliliter mark is observed. This time is taken as the measure of the settling rate. The shorter the time, the better the rate.

In other polymerizations, salts such as ammonium nitrate, ammonium chloride and ammonium sulfate have been used in place of the inorganic electrolytes employed above to produce suspension polymerizates of acrylic acid polymers.

In general, the alkali metal salts of strong protonic acids are preferred inasmuch as aqueous solutions of such salts are easily adjusted to give desired pH control. Increasing the acidity of the polymerization system some-

EXAMPLES 9–11

The following polymerizations illustrate that suspension polymerizates can be prepared when small amounts of a diluent comonomer are incorporated into the acrylic acid or acrylic acid-acrylamide monomer system. The polymerizations were carried out in a manner similar to that of Example 1. The total monomer concentration was 10% and the salt additive was either sodium sulfate or sodium chloride. Details of the polymerization and character of the resulting polymerizate are indicated in the following Table II.

TABLE II

| Ex. No. | Monomer composition [1] | Salt Type | Salt Conc., percent | Catalyst conc. percent | Polymer viscosity (cps.) | Polymerizate character |
|---|---|---|---|---|---|---|
| 9 | 39.6% AA / 1% DMAEM / 59.4% AM | Na₂SO₄ | 10 | .0092 | 29 | Thin suspension. |
| 10 | 37% AA / 10% DMAEM | Na₂SO₄ | 10 | .0092 | 55.8 | Thick suspension. |
| 11 | 25% VCN / 75% AA | Na₂SO₄ | 10 | .0582 | 13.6 | Thin suspension. |

[1] AA=acrylic acid; DMAEM=dimethylaminoethylmethacrylate; AM=acrylamide and VCN=acrylonitrile.

The polymers prepared in the above examples all evidenced good flocculation properties.

In further polymerizations, it was demonstrated that suspension polymerizates at salt concentrations of 10 percent or less are only obtained at an acid pH below about 3.2. In several systems including 90%/10% copolymers of acrylic acid and acrylamide and 50%/50% copolymers of acrylic acid and acrylamide, increasing the polymerization system to pH 4 and above resulted in nonfluid, gel polymerizates. It has further been found that the proportions of acrylic acid in the copolymers is critical for obtaining the desired fluid polymer suspensions with only 10 percent or less of salt in the reaction mixture.

In still other polymerizations the effect of increasing salt contents has been observed to have a generally depressing effect on the molecular weight of the polymer obtained as a suspension polymerizate. This is especially true with polymers with high contents of either acrylamide or acrylic acid. Thus for optimum molecular weights, the salt content should be held to just above the minimum necessary to produce a suspension polymerization in a given monomer and catalyst system.

We claim:

1. In a process which comprises copolymerizing a monomer composition of ethylenically unsaturated water-soluble monomers by free radical catalysis in an aqueous solution of said monomers containing inorganic salts, the improvement which comprises employing a monomer composition comprising from at least 30 percent to about 95 percent of acrylic acid and from 0 percent up to 70 percent of an acrylamide monomer, based on the total weight of monomers employed, said monomer composition being dissolved, at a pH within the range from about 1 to 3.2, in a water solution of an amount, within the range of 0.1 to about 10 percent by weight of the total polymerization system, of a water-soluble ammonium or alkali metal salt of a strong inorganic acid sufficient to precipitate polymer formed during the polymerization reaction but insufficient to precipitate the monomers, and carrying out the polymerization at a temperature below 60° C. with sufficient agitation of the reaction mixture to produce a polymerizate in the form of a fluid suspension of disperse, solid-polymer particles.

2. A process as in claim 1 wherein the total amount of monomer is from about 10 up to about 30 percent by weight, based on the weight of the entire polymerization system.

3. A process as in claim 1 wherein the water-soluble salt is an alkali metal chloride.

4. A process as in claim 3 wherein the water-soluble salt is sodium chloride.

5. The process of claim 1 wherein the water-soluble salt is an alkali metal sulfate.

6. The process of claim 5 wherein the water-soluble salt is sodium sulfate.

7. A process as in claim 1 wherein the monomer composition comprises, in addition to at least about 30 percent acrylic acid and, from 0 to about 70 percent of an acrylamide monomer, up to about 25 percent by weight of a diluent monomer copolymerizable with acrylic acid and soluble as a monomer in the polymerization system.

8. The process of claim 7 wherein the diluent monomer is a water-soluble aminoalkyl acrylate.

9. A method as in claim 1 and including the additional step of adding an amount of from about 0.1 to about 5 percent by weight of a water-soluble salt of a strong inorganic acid to the resulting suspension polymerizate to increase its stability as a suspension.

10. A method as in claim 1 and including the additional step of adding an organic solvent miscible with the suspension polymerizate to coagulate suspended polymer solids and recovering the solid polymeric product from the polymerizate by filtration.

11. A method as in claim 10 and including the additional step of blending an alkali metal carbonate or bicarbonate with the solid polymeric product to provide a self-neutralizing composition.

12. A process as in claim 1 wherein the initial monomer composition contains from 30 to 70 percent by weight of acrylic acid and the solution of water-soluble salt contains from 1 to 8 percent of said salt.

13. A process as in claim 1 wherein the amount of water-soluble salt is adjusted to a predetermined minimum for obtaining precipitation of the polymer.

14. A process as in claim 1 wherein the polymerization is carried out at temperatures in the range of 20° to 40° C.

References Cited

UNITED STATES PATENTS

| | | | |
|---|---|---|---|
| 3,041,318 | 6/1962 | Hess | 260—80 |
| 3,042,970 | 7/1962 | Terenzi | 18—47.3 |
| 3,046,259 | 7/1962 | Hess et al. | 260—80 |
| 3,215,680 | 11/1965 | Kolodny | 260—89.7 |
| 3,405,106 | 10/1968 | Scanley | 260—80 |
| 3,493,500 | 3/1970 | Volk et al. | 210—54 |

FOREIGN PATENTS

| | | | |
|---|---|---|---|
| 1,115,019 | 10/1958 | Germany | 260—80 |

JOSEPH L. SCHOFTER, Primary Examiner

S. M. LEVIN, Assistant Examiner

U.S. Cl. X.R.

210—54; 260—29.6 T, 29.6 WB, 78.5 R, 79.3 M, 79.7, 80, 80.72, 80.73, 85.5 AM, 86.1 N

PO-1050
(5/69)

UNITED STATES PATENT OFFICE
CERTIFICATE OF CORRECTION

Patent No.         3,658,772        Dated     25 April 1972

Inventor(s)     Henry Volk and Percy J. Hamlin

It is certified that error appears in the above-identified patent and that said Letters Patent are hereby corrected as shown below:

Column 2, line 48, delete "opening" and insert --opaque--.

Column 7, line 31, insert --system was maintained under effective polymerization-- between the words "-lymerization" and "conditions".

Column 9, Table II, change the first two columns of Examples 10 and 11 to read as follows:

```
        10........(36% AA
                  (10% DMAEM
                  (54% AM

11........(75% AA
                  (25% VCN
```

Signed and sealed this 10th day of October 1972.

(SEAL)
Attest:

EDWARD M. FLETCHER, JR           ROBERT GOTTSCHALK
Attesting Officer                 Commissioner of Patents